United States Patent
Clingerman et al.

(10) Patent No.: US 6,413,662 B1
(45) Date of Patent: *Jul. 2, 2002

(54) FUEL CELL SYSTEM SHUTDOWN WITH ANODE PRESSURE CONTROL

(75) Inventors: Bruce J. Clingerman, Palmyra, NY (US); Tien M. Doan, Columbia, MD (US); Donald H. Keskula, Webster, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,188

(22) Filed: Feb. 22, 2000

(51) Int. Cl.$^7$ ............................. H01M 8/04
(52) U.S. Cl. ................ 429/25; 429/13; 429/22
(58) Field of Search .................. 429/12, 13, 22, 429/23, 24, 25

(56) References Cited

U.S. PATENT DOCUMENTS

| | | |
|---|---|---|
| 4,128,700 A | 12/1978 | Sederquist |
| 4,293,315 A | 10/1981 | Sederquist |
| 4,642,272 A | 2/1987 | Sederquist |
| 4,650,727 A | 3/1987 | Vanderborgh et al. |
| 4,659,634 A | 4/1987 | Struthers |
| 4,670,359 A | 6/1987 | Beshty et al. |
| 4,678,723 A | 7/1987 | Wertheim |
| 4,816,353 A | 3/1989 | Wertheim et al. |
| 4,923,768 A | 5/1990 | Kaneko et al. |
| 4,994,331 A | 2/1991 | Cohen |
| 5,248,567 A | 9/1993 | Amemiya et al. |
| 5,271,916 A | 12/1993 | Vanderborgh et al. |
| 5,272,017 A | 12/1993 | Swathirajan et al. |
| 5,316,871 A | 5/1994 | Swathirajan et al. |
| 5,484,577 A | 1/1996 | Buswell et al. |
| 5,518,705 A | 5/1996 | Buswell et al. |
| 5,554,453 A | 9/1996 | Steinfeld et al. |
| 5,605,770 A | 2/1997 | Andreoli et al. |
| 5,637,415 A | 6/1997 | Meltser |
| 5,702,838 A | 12/1997 | Yasumoto et al. |
| 5,763,113 A | 6/1998 | Meltser et al. |
| 6,159,626 A | * 12/2000 | Keskula et al. ............ 429/22 |

FOREIGN PATENT DOCUMENTS

WO  WO 09/08771  3/1998

OTHER PUBLICATIONS

Szaniszlo, "The Advanced Low–Emissions Catalytic–Combustor Program: Phase I—Description and Status," ASME#79–GT–192 Mar. 19779.

Krill et al., "Catalytic Combustion for System Application," ASME#79–HT–54 Aug. 1979.

Hall et al., "A Porous Media Burner for Reforming Methanol for Fuel Cell Powered Electric Vehicles," SAE Paper#950095 Mar. 1995.

Natural Gas Power Plant System (a discriptive drawing)—No Date Available.

* cited by examiner

Primary Examiner—Carol Chaney
Assistant Examiner—Tracy Dove
(74) Attorney, Agent, or Firm—Karl F. Barr, Jr., Esq.; Cary W. Brooks, Esq.; Linda M. Deschere, Esq.

(57) ABSTRACT

A venting methodology and pressure sensing and vent valving arrangement for monitoring anode bypass valve operating during the normal shutdown of a fuel cell apparatus of the type used in vehicle propulsion systems. During a normal shutdown routine, the pressure differential between the anode inlet and anode outlet is monitored in real time in a period corresponding to the normal closing speed of the anode bypass valve and the pressure differential at the end of the closing cycle of the anode bypass valve is compared to the pressure differential at the beginning of the closing cycle. If the difference in pressure differential at the beginning and end of the anode bypass closing cycle indicates that the anode bypass valve has not properly closed, a system controller switches from a normal shutdown mode to a rapid shutdown mode in which the anode inlet is instantaneously vented by rapid vents.

5 Claims, 6 Drawing Sheets

1

FUEL CELL SYSTEM SHUTDOWN WITH ANODE PRESSURE CONTROL

GOVERNMENT SUPPORT

The Government of the United States of America has certain rights in this invention pursuant to Agreement No. DE-AC02-90CH10435 awarded by the U.S. Department of Energy.

FIELD OF THE INVENTION

This invention relates to a fuel cell system and more particularly to a system having a plurality of cells which consume an $H_2$-rich gas to produce power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX carbon dioxide ($CO_2$) is produced from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in U.S. patent application Ser. Nos. 08/975,422 and 08/980,087, filed in November, 1997, and U.S. Ser. No. 09/187,125, filed in November, 1998, and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively control gas flows ($H_2$ reformate and air/oxygen) to the fuel cell stack not only during start-up and normal system operation, but also during system shutdown. During the shutdown of a fuel cell system that generates hydrogen from liquid fuel, the anode CO emissions increase and can degrade the stack. Accordingly, a primary concern during shutdown is diverting the gas flows of $H_2$ and air/oxygen around or away from the fuel cell stack and disposing of the excess $H_2$. The $H_2$ and air flows being diverted from the stack during shutdown must also be kept separate to avoid creating a combustible mixture in the system. The stack must also be protected from prolonged (e.g., greater than five seconds) pressure differentials which could rupture the thin membranes in the membrane electrode assembly (MEA) separating the anode and cathode gases. It is accordingly important to ensure that the diversion of gas away from the stack occurs properly on shutdown and is reinstated properly on start-up.

SUMMARY OF THE INVENTION

In one aspect, the diversion of gas flows around the stack during shutdown is accomplished with anode and cathode bypass valves. In the fuel cell system adapted for use in vehicular applications, the bypass valves comprise relatively slow-moving automotive type bypass valves. The invention solves the potential problems posed due to failure of a bypass valve to close and divert flow around the stack which can degrade the stack. In particular, inoperability of the anode bypass valve on shutdown can degrade the stack with excess CO in the $H_2$ reformate from the fuel processor. Likewise, failure of the anode bypass valve to open upon start up of the fuel cell system can result in cell reversal. Cell reversal occurs when the fuel cell stack is loaded and not enough $H_2$ is supplied to the anode inlet, causing membrane breakthrough and permanent stack degradation. Accordingly, the invention provides method and apparatus to ensure that the diversion of gas away from the anode occurs properly on shutdown, and is reinstated properly on start up. Here, an anode bypass valve and associated valving arrangement is used to ensure proper diversion and reinstatement of flow.

In another aspect, the present invention provides a methodology and valving arrangement for ensuring that the anode bypass valve is closed during a normal shutdown. If it is determined that the anode bypass valve has not properly closed during normal shutdown, the fuel cell system is put into a rapid shutdown mode in which CO-rich $H_2$ reformate is instantaneously vented from the anode inlet. This protects the stack from CO degradation.

According to one aspect of the invention, the pressure at the anode inlet is compared to the pressure Mat the anode outlet. This anode-side pressure drop across the stack decreases rather quickly during a normal shutdown in which the anode bypass valve works properly. When the anode bypass valve closes, by monitoring the "gap" or pressure differential between the anode inlet and outlet during the first few seconds of shutdown, it can be determined whether the anode bypass valve has closed properly. A "closed" bypass valve is defined as a valve position directing all flow around the stack. If the gap between anode inlet and outlet pressures drops quickly to near zero in the first few seconds, the anode bypass valve has closed properly. If the gap between anode inlet and outlet pressures drops slowly, or increases during shutdown, a signal is generated by the fuel system controller or software indicating anode bypass failure and triggering a rapid shutdown. In the rapid shutdown mode, the anode inlet is instantaneously vented by a fast-acting vent in the flow path from the anode bypass valve to the anode inlet.

In another aspect of the invention, pressure sensors are added to the anode inlet and outlet, and optionally any limit switches, wiring, and input/output structure associated with the bypass valving for physical verification of proper operation are removed. The difference in pressures as determined by the sensors at the anode inlet and outlet is carefully monitored at least during a normal shutdown procedure, and the difference tracked over a period of time corresponding to the time in which pressure at the anode inlet can typically be expected to equalize with the pressure at the anode outlet if the anode bypass valve closes properly. If the pressure differential does not significantly decrease over the prescribed period of time, a signal is generated indicating anode bypass failure and the system is switched to a rapid shutdown mode in which the anode inlet is instantaneously vented.

The vent valving for carrying out the invention methodology may comprise existing valves and a fuel cell system controlled according to the invention methodology during a shutdown, or may comprise single-purpose valving added to an existing fuel cell system. Monitoring of the pressure differential via the pressure sensors can be through a dedicated controller comprising any suitable microprocessor, microcontroller, personal computer, etc. which has a central processing unit capable of executing a control program and data storage in the memory. The controller may additionally comprise an existing controller in a fuel cell system. Control of the fast-acting vent valving in rapid shutdown is achieved in similar fashion.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

The invention is particularly useful for fuel cell systems used to produce power for vehicle propulsion. This may be further understood with reference to the fuel cell system shown in FIG. 1 by way of example only. Therefore, before further describing the invention, it is useful to understand the type of system within which the anode bypass monitoring methodology can be employed to protect the stack, and further to illustrate the location and interplay of bypass and vent valving in such a system.

Figure 1:
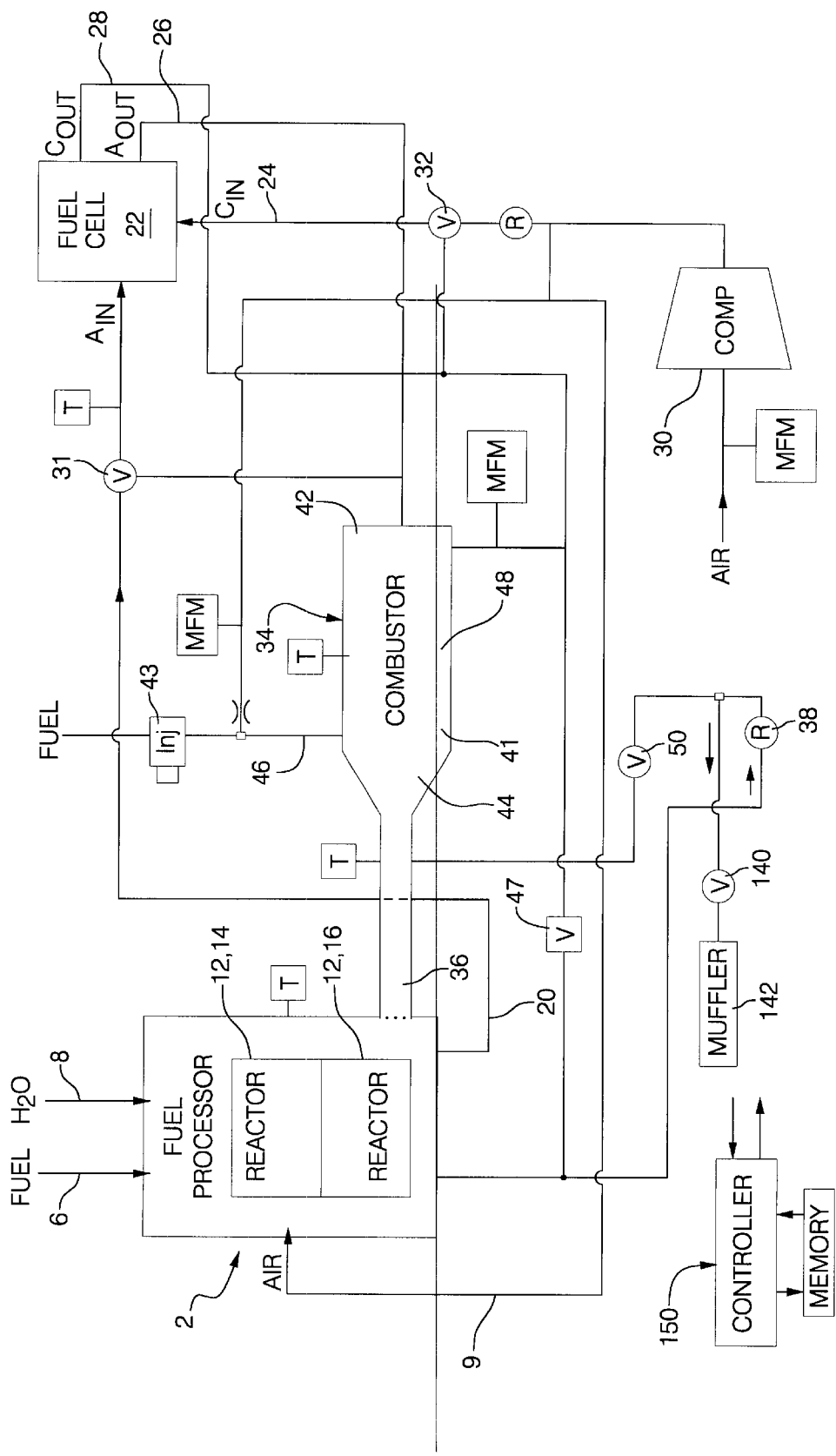
FIG. 1 is a drawing depicting a fuel cell system to which the bypass valve monitoring methodology and a preferred venting arrangement according to the present invention can be applied.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to "$H_2$" as hydrogen-rich or having a relatively high hydrogen content.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produce carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. Then, during running mode, $H_2$ rich reformate 20 is fed through valve 31 into the anode chamber of a fuel cell stack 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by an air supply, preferably compressor 30. Air from the air supply (compressor 30) is directed to the fuel cell 22 by a valve 32 under normal operating conditions. During start-up, however, the valve 32 is actuated to provide air directly to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat to be added. This is typically accomplished by preheating the reactants (fuel 6, steam 8, and air 9) and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with an inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits release of the combustor exhaust 36 to atmosphere when it is not needed to heat reactors in the fuel processor 2.

As can be seen, the hydrocarbon fuel stream 46 supplements the anode effluent 26 as fuel for the combustor 34, as may be needed, to meet the transient and steady state needs of the fuel cell apparatus. In some situations, exhaust gas passes through a regulator 38, a shutoff valve 140 and a muffler 142 before being released to the atmosphere. In FIG. 1, the symbols are as follows: V is valve, MFM is mass flow meter, T is temperature monitor, R is regulator, C is cathode side, A is anode side of fuel cell, INJ is injector, and COMP is compressor.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air is also used in the fuel processor reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and the combustor 34 ultimately satisfies the heat demanded by the fuel processor 2. The oxygen or air provided to the combustor 34 includes one or both of cathode effluent exhaust 28, which is typically a percentage of the total oxygen supplied to the cathode of the fuel cell 22, and a compressor output air stream depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and the process includes the following: (1) cathode bypass valve 32 is activated (i.e., opened) to direct air to the cathode side of the fuel cell 22; (2) fuel and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel, air, cathode effluent 28 and anode effluent 26 are burned in the combustor 34. In a preferred sequence, step (2) is implemented first along with the supplying of air directly to the combustor. Then, when the hydrogen-rich stream has adequately low CO level, steps (1) and (3) are implemented, followed by steps (4), (5) and (6).

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to supplement the Aout (26) to the combustor 34. It can be seen that the combustor 34 receives multiple fuels, such as a hydrocarbon fuel as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has a central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
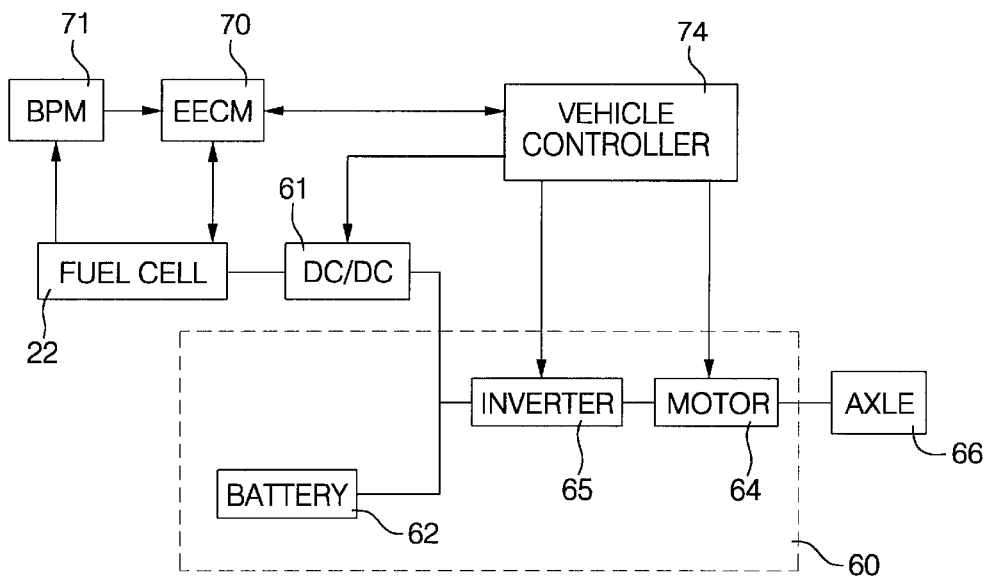
FIG. 2 is a drawing of the fuel cell system shown in FIG. 1 connected in a pictorial representation of a use application.

In a preferred embodiment, the fuel cell system uses the fuel cell 22 as part of a vehicle propulsion system (see FIG. 2). Here, a portion of the propulsion system 60 comprises a battery 62, an electric motor 64, and associated drive electronics in the form of an inverter 65, constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative braking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the inverter 65, the DC/DC converter 61, and requests a power level from the EECM 70.

The gas flows ($H_2$ and air) to the fuel cell 22 and combustor 34 in the fuel cell system of FIG. 1 have been described for a start-up mode and a run mode. Such systems also have a shutdown mode in which the gas flows to the fuel cell 22 are diverted and finally terminated, for example when a vehicle using the fuel cell system for propulsion is turned off. This diversion and termination of gas flow is accomplished through previously-illustrated valves 31 and 32 for the $H_2$ and air flows to the anode and cathode, respectively. In the illustrated system for vehicle propulsion, valves 31 and 32 typically take the form of automotive type bypass valves, usually solenoid-operated ball valves with a pipe diameter of around 1 to 1½ inches. These are generally three-way valves (one input, two possible outputs) whose function includes closing to bypass the flow of $H_2$ and air from fuel cell 22 to combustor 34 during shutdown.

Air flow to the combustor through cathode bypass valve 32 prevents the combustor from overheating as it burns off residual $H_2$ from anode bypass valve 31 and effluent tapered off from the anode outlet of fuel cell 22. Continued air flow then promotes cooldown of the combustor after all residual $H_2$ has been burned off. A typical operating temperature for a combustor used in a fuel cell apparatus of the type illustrated in FIG. 1 is 600° C. Overheating can degrade the combustor, requiring expensive repairs or replacement. Accordingly, providing sufficient air flow to the combustor during shutdown, both to maintain a constant temperature for residual burn off and then for combustor cooldown, must be given a priority during the shutdown procedure.

Figure 2A:
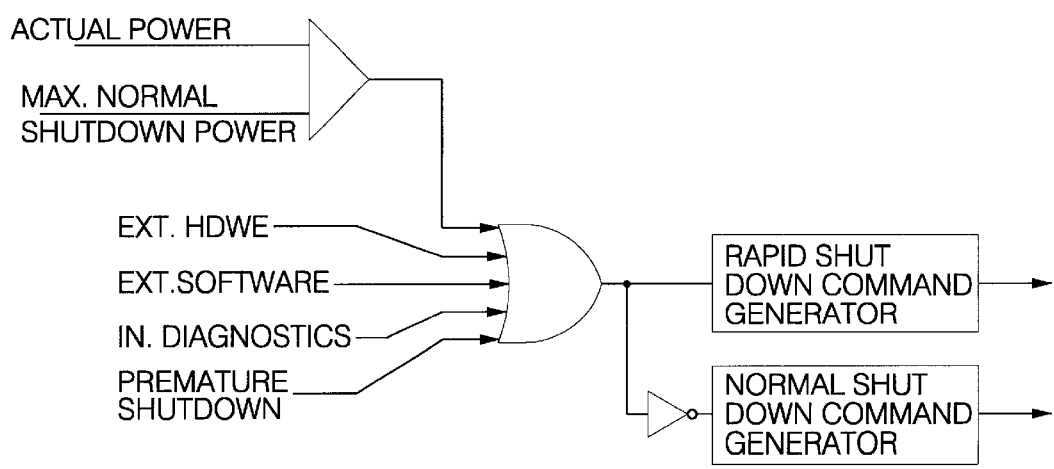
FIG. 2A is a flow diagram depicting an exemplary generation of normal and rapid shutdown commands by an onboard vehicle system.

The controller 150 shown in FIG. 1, which may be implemented by way of non-limiting example in the BPM 71 and/or the EECM 70, monitors the operation of the fuel cell system with respect to pressures, temperatures, start-up times, cycles, etc. and routinely generates shutdown commands in response to selected transition conditions of the system for transmittal to the controller logic (see FIG. 2A).

The system shutdown control according to the present invention may be implemented in either hardware or software. Preferably, the control is implemented in software as part of the control program on the controller 150. FIG. 2A is an exemplary representation of control as a logic circuit, as disclosed in U.S. patent application Ser. No. 09/345,139 [H-204426] [GMLS-4426] co-owned with the present application by the assignee of the present application. The logic in FIG. 2A examines each shutdown command signal received from controller 150 and makes a determination or differentiation with respect to whether the shutdown command should be viewed as a rapid shutdown command or a normal shutdown command. The differentiation involves examining criteria which are briefly illustrated in FIG. 2A, and which are described in detail in the co-pending application referred to above. The details of the normal and rapid shutdown command decision and signal generation are not critical to the present invention, whose anode bypass monitoring methodology and vent valving arrangements are capable of use with many different forms of shutdown command schemes.

The present invention is directed to monitoring the operation of anode bypass valve 31 during a normal shutdown, and to trigger a rapid shutdown if the anode bypass fails to close.

FIGS. 3–6 illustrate a preferred embodiment of the invention methodology and a preferred venting and pressure sensing arrangement for use with a system such as that illustrated in FIG. 1. It will be understood that FIGS. 3–6 are simplified illustrations based on the system shown in FIG. 1, emphasizing gas flows, valve operation, and the addition of pressure sensors for carrying out the invention. The additional pressure sensors are shown as pressure sensor 100 in $H_2$ Supply path 20 between anode bypass valve 31 and anode inlet 22a, at or near the anode inlet to effectively sense the anode inlet pressure, and pressure sensor 102 in pressure communication with anode outlet 22c via line or path 21 from the anode outlet to the combustor. Check valving 90, 92 is preferably provided between the anode outlet 22c and the cathode outlet 22d and the combustor, to prevent backflow in the flow paths. Pressure sensor 102 is downstream of check valve 90 in line 21. Additional vent valving is shown at 80, 82 related to the anode bypass valve 31, and at 86 related to the cathode bypass valve 32 and cathode inlet 22b. An optional cooler is provided upstream of anode inlet 22b.

In a preferred form vent valves 80, 82 and 86 are fast-acting solenoid vents. Combustible vent 84 and oxidant vent 88 may simply discharge to atmosphere, and are kept separate to avoid creating a combustible mixture of $H_2$ and air in the system during the venting process described below. Pressure sensors 100 and 102 can be any known type capable of generating signals which represent the pressure at the anode inlet and outlet and which signals can further be compared in a realtime basis to track the pressure differential between the anode inlet and outlet.

It will be understood that although vents 84 and 88 are preferably simple discharges to atmosphere, they may take other forms such as, but not limited to, holding tanks, adsorber beds, and other known devices for storing or handling gas flows.

Figure 3:
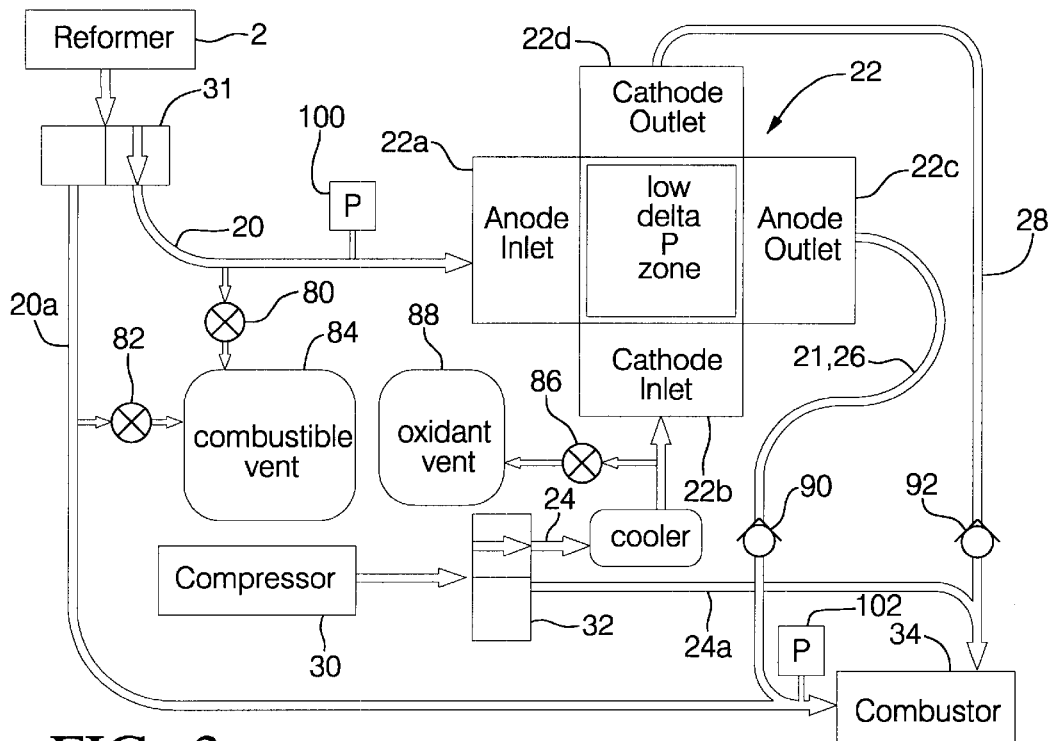
FIG. 3 is a simplified, idealized gas flow and venting representation of the fuel cell system of FIG. 1 provided with a venting arrangement according to the present invention, in a normal operating (i.e., non-shutdown) mode just prior to receiving a shutdown command.
Figure 3A:
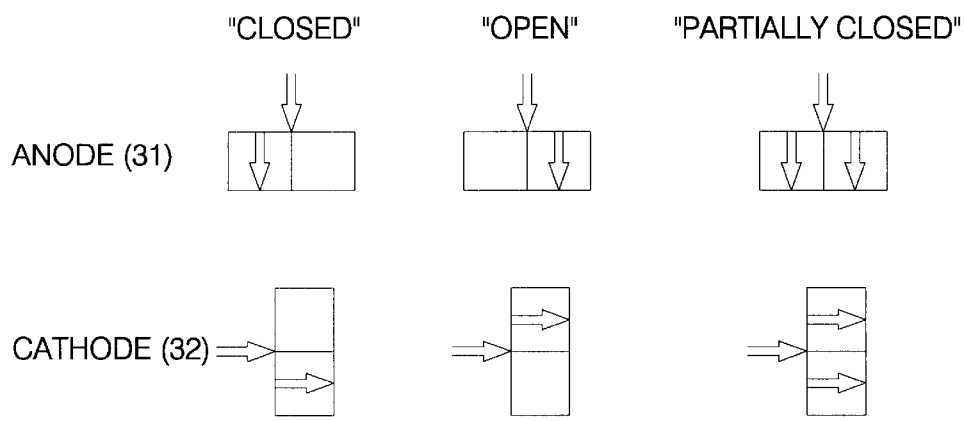
FIG. 3A shows the bypass valve symbols used to illustrate the invention in FIGS. 3 to 6.

FIG. 3 represents the fuel cell system according to the invention in a normal operating (i.e., pre-shutdown) mode just prior to receiving a shutdown command. $H_2$ flows freely from bypass valve 31 through line 20 past pressure sensor 100 to anode inlet 22a. After being processed by the fuel cell stack, the effluent leaves anode outlet 22c and proceeds through line 21 past pressure sensor 102 and then to combustor 34 where it is combusted as described above. Bypass valve symbols are further shown in FIG. 3A.

During the normal operating condition of the system in FIG. 3, the $H_2$ flow through the anode side of the stack has a significant, measurable pressure drop which makes the anode outlet pressure as measured by sensor 102 significantly lower than the anode inlet pressure as measured by sensor 100. This pressure drop or differential is very predictable during normal operation, and is monitored by the system controller (FIG. 1).

Figure 4:
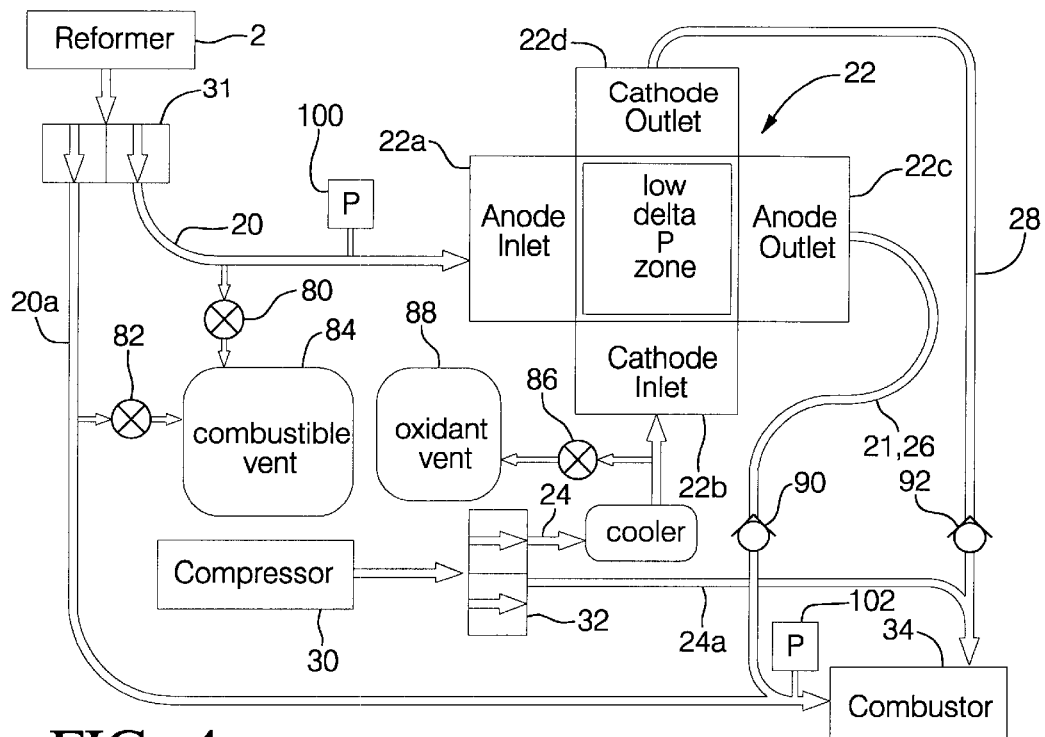
FIG. 4 illustrates the fuel cell system of FIG. 3 in an intermediate stage of normal shutdown, in which the cathode bypass valve is partially closed, and the anode bypass valve is partially closed.

Upon receipt of a normal shutdown command from the controller, anode bypass valve 31 begins to close as shown in FIG. 4. Anode inlet pressure as measured by sensor 100 begins to drop rapidly over the few seconds it normally takes the bypass valve to close. A typical operating speed for an automotive type bypass valve as shown at 31 is one to five seconds for complete closure.

Figure 5:
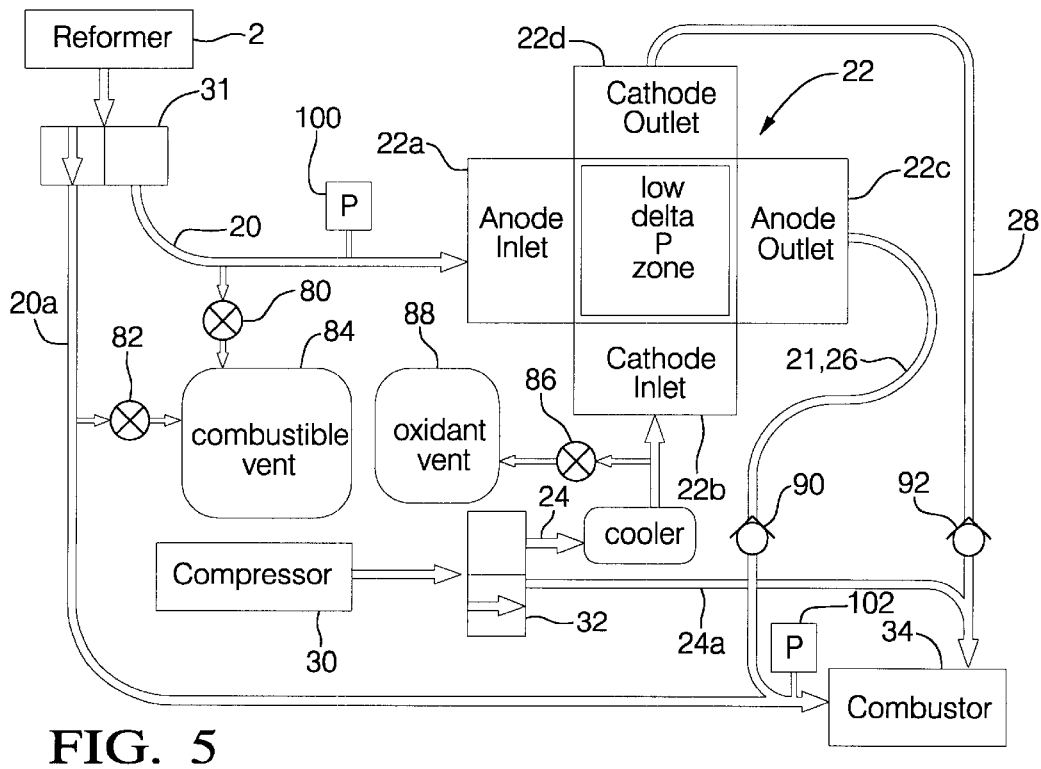
FIG. 5 illustrates the fuel cell system of FIG. 3, in which the cathode bypass valve is fully closed, and in which the anode bypass valve has been commanded to be closed.

FIG. 5 shows the fuel cell system with anode bypass valve 31 fully closed to completely bypass the anode inlet and fuel stack 22. If anode bypass valve 31 has functioned properly, there is no flow past sensor 100 and the pressure across the stack essentially equalizes so that the pressure signals as reported by sensors 100 and 102 are approximately the same.

During a normal shutdown, the $H_2$ supply will supply the same level of $H_2$ for a short time. Depending on the location of sensor 102, this may result in an increase in pressure at sensor 102. However, this increase is not transmitted to the anode inlet in pressure sensor 100 due to check valve 90 in line 21. Ultimately, though, pressure from the $H_2$ supply at sensor 102 drops as the $H_2$ supply is gradually shut off during the shut down procedure.

The invention methodology determines whether or not anode bypass valve 31 actually closed in the normal shutdown situation of FIG. 5. This is determined by tracking the pressure differential between sensors 100 and 102 over a period of time corresponding generally to the shutdown period, e.g. one to five seconds. Anode bypass valve 31 is deemed to have closed properly as long as the following relationship is achieved: Pressure(100) −Pressure(102) $_{t=0}$>>Pressure(100)−Pressure(102) $_{t=1}$ where: t=0 is prior to the anode bypass valve moving (flow through the stack), and t=1 is after the anode bypass valve should have closed, corresponding to flow bypassing the stack. It is understood that time t=0 corresponds to the initiation of a shutdown command, or just prior to or immediately after initiation of a shutdown command.

If the pressure differential between the anode inlet and anode outlet as measured by the pressure sensors does not roughly equalize during the expected shutdown time period, the system controller deems the anode bypass valve to be inoperable or to not have closed, and prompts the system to a rapid shutdown as described above with reference to FIG. 2A.

Figure 6:
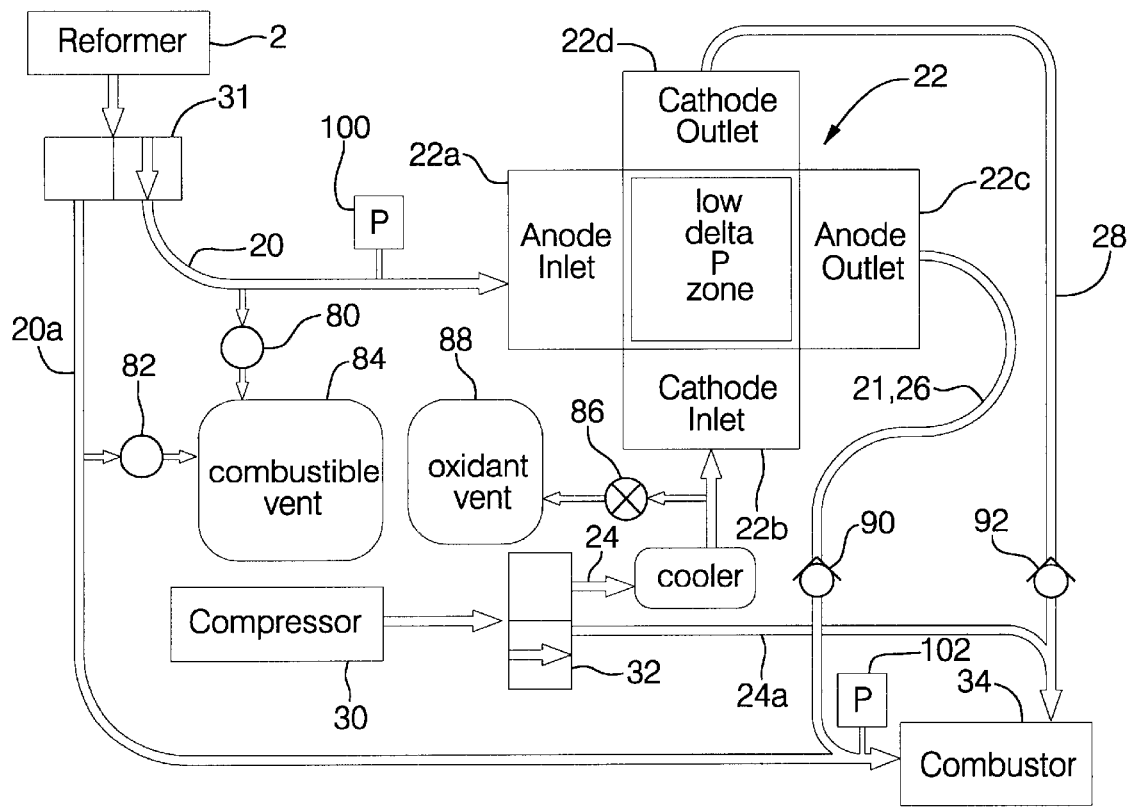
FIG. 6 illustrates the fuel cell system of FIG. 5 in a rapid shutdown mode after inoperability of the anode bypass has been detected.

In the rapid shutdown, to prevent degradation of stack 22 from the now CO-rich $H_2$ reformate coming from the $H_2$ supply, the goal is to vent this CO-rich $H_2$ from the stack as quickly as possible. In accordance with this objective, the invention in FIG. 6 opens fast-acting vent valves 80 and 82 to vent the CO-rich reformate from the stack to combustible vent 84. The open position is illustrated in FIG. 6 by the open circles representing the location of fast-acting (rapid) vent valves 80 and 82. This eliminates the possibility of CO degradation of the stack. In FIG. 6, bypass valves 31 and 32 are completely closed, that is, they have completely diverted $H_2$ and air from the fuel cell stack 22 and are now only open to combustor 34 through lines 20a and 24a, respectively. Optionally, to eliminate prolonged pressure differentials across the stack created by the venting of the anode inlet, fast-acting vent 86 may be vented to oxident vent 88 to relieve pressure from the cathode side of the stack. In accordance with an invention which is the subject of application filed Feb. 11, 2000, Ser. No. 09/502,640 (H-205764), owned by the assignee of this application, vent valve 86 may be vented after the cathode bypass valve 32 has closed completely, so as not to interfere with the flow of cooling air to the combustor during the rapid shutdown.

Figure 7:
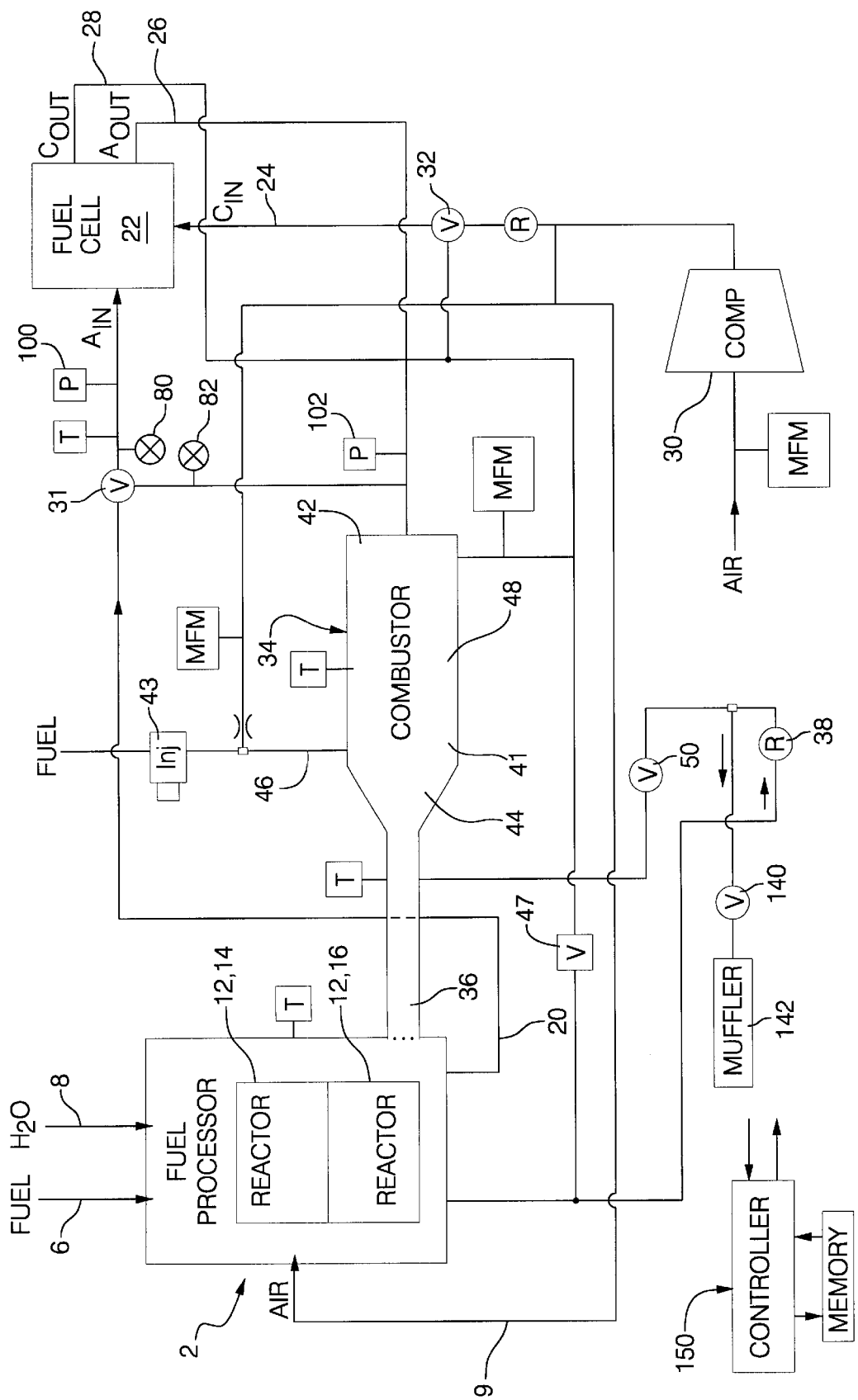
FIG. 7 illustrates the fuel cell system of FIG. 1 with vent valving added to carry out the anode bypass monitoring methodology of the present invention.

Referring next to FIG. 7, the fuel cell system of FIG. 1 is shown with the addition of pressure sensors 100, 102 and fast-acting rapid vents 80, 82. With the pressure sensor and vent valving arrangement of FIG. 7, the fuel cell system can be monitored for proper closing of anode bypass valve 31 by controller 150 using the above-described invention methodology.

Although the primary purpose of the invention is to vent the anode inlet during a normal shutdown if the anode bypass valve fails to close, another important feature is the ability of the controller to set a diagnostic flag in the event of inoperability of the anode bypass. Accordingly, if the system is prompted into a rapid shutdown, the operator can quickly determine the cause, such as inoperability of the anode bypass valve during a normal shutdown.

Although the invention methodology has been described with reference to a particular fuel cell system as illustrated in FIGS. 1 and 7, it will of course be understood that the invention methodology can be applied to other fuel cell system arrangements-using anode bypass valving. In FIG. 7, pressure sensors and 102 are shown as add-ons to an existing system. Fuel cell systems incorporating pressure sensors in these locations to merely serve as an overall pressure diagnostic, are operable according to the invention so that the signals from these pressure sensors can be utilized by the system controller for the inventive anode bypass monitoring by reprogramming the controller to monitor the pressure differential between them according to the formula set forth above. These and other departures and modifications from the specific example illustrated herein will be apparent to those skilled in the art now that we have disclosed our invention.

What is claimed is:

1. In a fuel cell system having a fuel cell stack with an anode inlet and anode outlet, a method for detecting a variance from a normal shutdown mode during shutdown comprising the following steps:

providing an anode bypass valve communicating with the anode inlet, and a controller capable of determining the pressures at the anode inlet and anode outlet;

sensing the anode inlet and outlet pressures when a normal shutdown is initiated, and generating a first pressure differential value;

sensing the pressure at the anode inlet and outlet at a time when the anode bypass valve should be closed during normal shutdown and generating a second pressure differential value; and, comparing the first pressure differential value with the second pressure differential value, and if the first pressure differential value does not exceed the second pressure differential value by a predetermined amount, switching from a normal shutdown mode to a rapid shutdown mode.

2. The method of claim 1, wherein the step of switching from a normal shutdown mode to a rapid shutdown mode includes the step of instantaneously venting the anode inlet of the fuel cell stack.

3. The method of claim 1, wherein the first and second pressure differential values are monitored during the time period over which the anode bypass valve is expected to move from an open position to the closed position during shutdown, and triggering the rapid shutdown mode if the second pressure differential value increases as normal shutdown proceeds.

4. In a fuel cell system having a fuel cell stack with an anode inlet and anode outlet, a method for detecting a variance from a normal shutdown mode during shutdown comprising the following steps:

sensing the anode inlet and outlet pressures and generating a first pressure differential value at the time a normal shutdown is initiated;

sensing the pressure at the anode inlet and outlet at a time after said normal shutdown was initiated, and generating a second pressure differential; and comparing the first pressure differential value with the second pressure differential value, and if the first pressure differential value does not exceed the second pressure differential value by a predetermined amount, switching from a normal shutdown mode to a rapid shutdown mode.

5. The method of claim 4, wherein the step of switching from a normal shutdown mode to a rapid shutdown mode includes the step of instantaneously venting the anode inlet of the fuel cell stack.

* * * * *